(12) United States Patent
Carteri et al.

(10) Patent No.: US 8,271,982 B2
(45) Date of Patent: Sep. 18, 2012

(54) RESCHEDULING JOBS FOR EXECUTION BY A COMPUTING SYSTEM

(75) Inventors: Francesco Maria Carteri, Rome (IT); Filomena Floriana Ferrara, Marino (IT); Scot MacLellan, Rome (IT)

(73) Assignee: International Business Machines Corporation, Armonk, NY (US)

( * ) Notice: Subject to any disclaimer, the term of this patent is extended or adjusted under 35 U.S.C. 154(b) by 1168 days.

(21) Appl. No.: 12/117,118

(22) Filed: May 8, 2008

(65) Prior Publication Data

US 2009/0282411 A1    Nov. 12, 2009

(51) Int. Cl.
    *G06F 9/46*    (2006.01)
(52) U.S. Cl. ......... 718/102; 718/104; 718/105; 718/106
(58) Field of Classification Search .................. None
    See application file for complete search history.

(56) References Cited

U.S. PATENT DOCUMENTS

| | | | |
|---|---|---|---|
| 4,852,001 A | 7/1989 | Tsushima et al. | |
| 6,038,539 A | 3/2000 | Maruyama et al. | |
| 6,721,749 B1* | 4/2004 | Najm et al. ........................... | 1/1 |
| 6,823,346 B2 | 11/2004 | MacLellan et al. | |
| 2002/0194247 A1* | 12/2002 | Caggese et al. ............... | 709/102 |
| 2004/0194107 A1* | 9/2004 | Masuoka ..................... | 718/100 |
| 2004/0199359 A1* | 10/2004 | Laird ........................... | 702/182 |
| 2005/0027504 A1 | 2/2005 | Watanabe | |
| 2005/0076043 A1 | 4/2005 | Benedetti et al. | |
| 2009/0113435 A1* | 4/2009 | Mizrachi et al. .............. | 718/102 |
| 2009/0113442 A1 | 4/2009 | Deidda et al. | |
| 2009/0313631 A1 | 12/2009 | De Marzo et al. | |

FOREIGN PATENT DOCUMENTS

EP    1387267 A1    2/2004

OTHER PUBLICATIONS

Al-Omari et al.; Novel Algorithms for Open-loop and Closed-loop Scheduling of Real-time Tasks in Multiprocessor Systems Based on Execution Time Estimation; 2003 IEEE Computer Society, Proceedings of the International Parallel and Distributed Processing Symposium (IPDPS'03); 8 pages.

* cited by examiner

*Primary Examiner* — Emerson Puente
*Assistant Examiner* — Sisley Kim
(74) *Attorney, Agent, or Firm* — Francis Lammes; Stephen J. Walder, Jr.; Jeffrey S. Labaw

(57) ABSTRACT

A mechanism is provided for rescheduling jobs for execution by a computing system. The computing system receives job related data associated with a plurality of jobs to be executed by the computing system, time constraint data, and maximum time shift values associated with the time constraint data. The computing system determines that a start time for execution of a first job of the plurality of jobs should be rescheduled. The computing system receives workload statistics. The computing system determines based on the workload statistics, a first start time for the first job. The computing system compares the time constraint data with the first start time to determine if the first start time is in conflict with the time constraint data. The computing system stores the first start time.

20 Claims, 4 Drawing Sheets

RESCHEDULING JOBS FOR EXECUTION BY A COMPUTING SYSTEM

FIELD OF THE INVENTION

The present invention relates to a method and associated system for rescheduling jobs to be executed by a computing system.

BACKGROUND OF THE INVENTION

Avoiding conflicts in a system typically comprises an inefficient process with little flexibility. Accordingly, there exists a need in the art to overcome at least some of the deficiencies and limitations described herein above.

SUMMARY OF THE INVENTION

The present invention provides a scheduling method comprising:

receiving, by a computing system, job related data associated with a plurality of jobs to be executed by said computing system;

receiving, by said computing system, time constraint data associated with said plurality of jobs;

receiving, by said computing system, maximum time shift values associated with said time constraint data;

determining, by said computing system based on said time constraint data and said maximum time shift values, that a start time for execution of a first job of said plurality of jobs should be rescheduled;

receiving, by said computing system, workload statistics associated with additional jobs to be executed by said computing system;

determining, by said computing system based on said workload statistics, a first start time for said first job, wherein said first start time comprises a time when said computing system performs a fewest number of specified functions as compared to all other functions performed by said computing system, and wherein said first start time is selected from a specified time period;

comparing, by said computing system, said time constraint data with said first start time to determine if said first start time is in conflict with said time constraint data; and storing, by said computing system, said first start time.

The present invention provides a computing system comprising a processor coupled to a computer-readable memory unit, said memory unit comprising instructions that when executed by the processor implements a scheduling method, said method comprising:

receiving, by said computing system, job related data associated with a plurality of jobs to be executed by said computing system;

receiving, by said computing system, time constraint data associated with said plurality of jobs;

receiving, by said computing system, maximum time shift values associated with said time constraint data;

determining, by said computing system based on said time constraint data and said maximum time shift values, that a start time for execution of a first job of said plurality of jobs should be rescheduled;

receiving, by said computing system, workload statistics associated with additional jobs to be executed by said computing system;

determining, by said computing system based on said workload statistics, a first start time for said first job, wherein said first start time comprises a time when said computing system performs a fewest number of specified functions as compared to all other functions performed by said computing system, and wherein said first start time is selected from a specified time period;

comparing, by said computing system, said time constraint data with said first start time to determine if said first start time is in conflict with said time constraint data; and storing, by said computing system, said first start time.

The present invention provides a computer program product, comprising a computer readable medium comprising a computer readable program code embodied therein, said computer readable program code adapted to implement a scheduling method within a computing system, said method comprising:

receiving, by said computing system, job related data associated with a plurality of jobs to be executed by said computing system;

receiving, by said computing system, time constraint data associated with said plurality of jobs;

receiving, by said computing system, maximum time shift values associated with said time constraint data;

determining, by said computing system based on said time constraint data and said maximum time shift values, that a start time for execution of a first job of said plurality of jobs should be rescheduled;

receiving, by said computing system, workload statistics associated with additional jobs to be executed by said computing system;

determining, by said computing system based on said workload statistics, a first start time for said first job, wherein said first start time comprises a time when said computing system performs a fewest number of specified functions as compared to all other functions performed by said computing system, and wherein said first start time is selected from a specified time period;

comparing, by said computing system, said time constraint data with said first start time to determine if said first start time is in conflict with said time constraint data; and storing, by said computing system, said first start time.

The present invention advantageously provides a simple method and associated system capable of avoiding conflicts in a system.

DETAILED DESCRIPTION OF THE INVENTION

Figure 1:
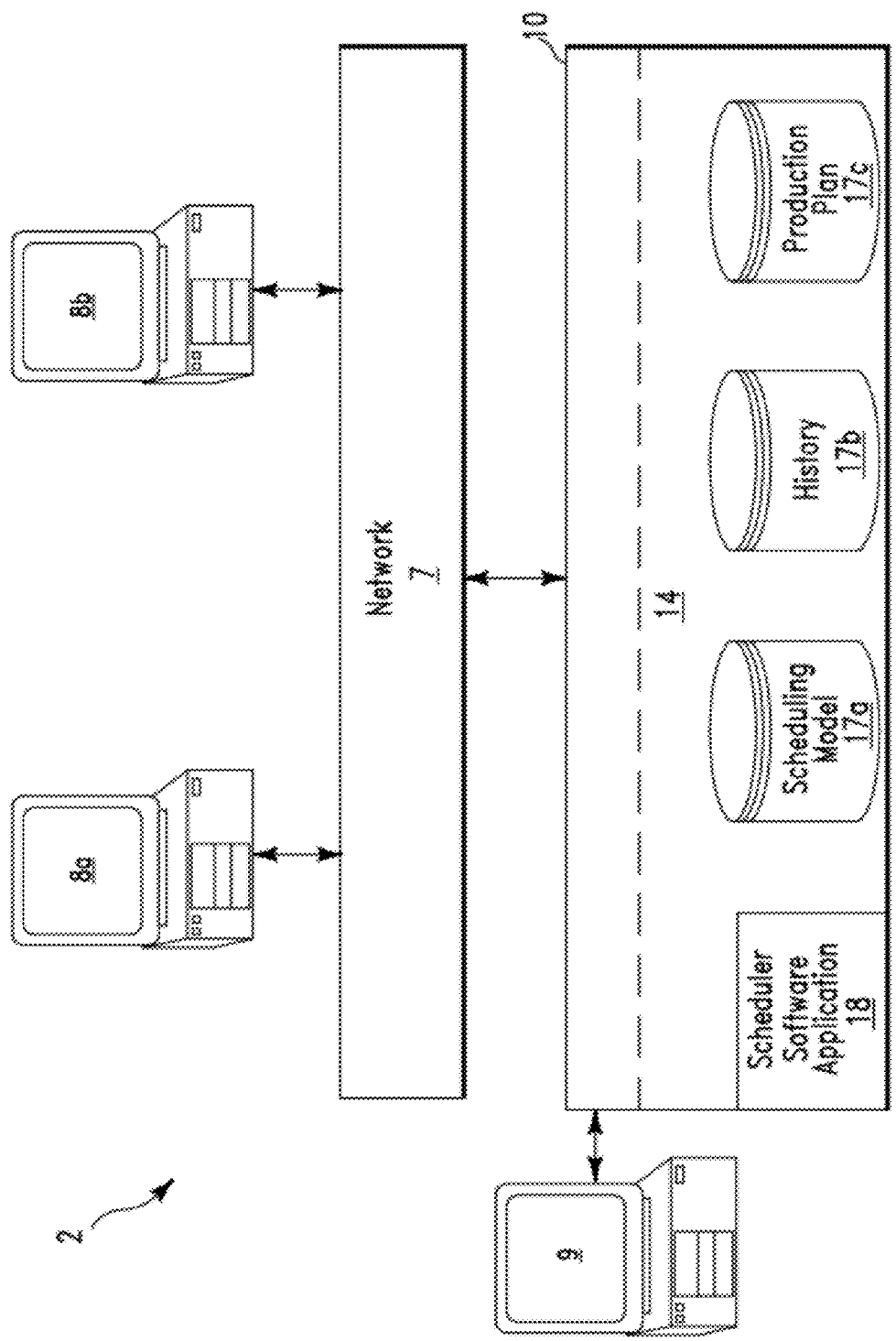
FIG. 1 illustrates a system for shifting scheduled start times for executing jobs in a computing system, in accordance with embodiments of the present invention.

FIG. 1 illustrates a system 2 for shifting scheduled start times for executing jobs or a job stream in a computing system 10 and/or computing apparatus 8a and 8b, in accordance with embodiments of the present invention. A job is defined herein as a unit of work (e.g., a command, a script, a call to a service, etc) that is executed by computing system 10 and/or computing apparatus 8a and 8b according to a specified time constraint. A job stream is defined herein as a plurality of jobs (e.g., a set of jobs). A job stream may be associated with a specified time constraint. A time constraint is defined herein as a specified time range or latest start time that a job or job stream must be executed in accordance with. A time constraint may be placed on a job or job stream in order to perform, inter alia, maintenance procedures associated with computing system 10 and/or computing apparatus 8a and 8b, specified functions associated with computing system 10 and/ or computing apparatus 8a and 8b, etc. Computing system 10 is used for shifting scheduled start times for executing jobs or a job stream based on job/job stream data, time constraints data, dependencies data, and time shift values. The scheduled start times may be shifted to alternative start times that comprise times when computing system 10 and/or computing apparatus 8a and 8b performs a fewest number of specified functions as compared to all other functions performed by computing system 10 and/or computing apparatus 8a and 8b. The specified functions may comprise a number of jobs executed, a CPU load, memory usage, an input/output (I/O) rate, a derivated metric, etc. Additionally, the scheduled start times may be shifted to alternative start times that do not conflict with additional jobs (i.e., dependencies). Dependencies data comprises data specifying dependencies associated with a job to be rescheduled. For example, a dependency could specify that a job X/job stream X (i.e., a job that will be rescheduled) may be executed only after an execution of a predecessor job Y/job steam Y. Time shift values comprise values associated with the time constraint data.

System 2 of FIG. 1 comprises a computing apparatus 8a and a computing apparatus 8b connected to a computing system 10 through a network 7. Additionally, computing apparatus 9 (e.g., a scheduling administrator terminal) is connected to computing system 10. Network 7 may comprise any type of network including, inter alia, a local area network, (LAN), a wide area network (WAN), the Internet, etc. Computing apparatus 9 is used by a scheduling administrator to enter data (e.g., job data associated with the job/job stream, time constraints data, dependencies data, and time shift values) for generating a model for scheduling and rescheduling jobs and/or job streams for execution by computing system 10 and/or computing apparatus 8a and 8b. Additionally, computing apparatus 9 may be used by a scheduling administrator to submit a request for generating a production plan stored in repository 17c. Computing apparatus 8a, 8b, and 9 may each comprise, inter alia, a personal computer, a laptop computer, a computer terminal, etc. Computing apparatus 8a, 8b, and 9 may each comprise a single computing apparatus or a plurality of computing apparatuses. Computing system 10 may comprise any type of computing system(s) including, inter alia, a personal computer (PC), a server computer, a database computer, etc. Computing system 10 may comprise a single computing system or a plurality of computing systems. Computing system 10 comprises a memory system 14. Memory system 14 may comprise a single memory system. Alternatively, memory system 14 may comprise a plurality of memory systems. Memory system 14 may be internal to computing system (e.g., as illustrated in FIG. 1) or external to computing system 10. Memory system 14 comprises a scheduler software application 18 and repositories 17a . . . 17c. Repositories 17a . . . 17c may be located internal to memory system 14 or external to memory system 14. Repositories 17a . . . 17c may be databases. Scheduler software application 18 comprises a modeler component (a software module) and a planner component (a software module). The modeler component provides interfaces to generate a scheduling model(s) based on inputted job data (i.e., associated with the job/job stream), time constraints data, dependencies data, and time shift values. A scheduling model (i.e., in repository 17a) comprises object definitions for the scheduling model. The planner component provides interfaces to create a production plan based on inputted job data (i.e., associated with the job/job stream), time constraints data, dependencies data, and time shift values. The production plan is used to enable the execution of the jobs/job stream occurrences (instances). The production plan comprises occurrences (instances) of object definitions. Additionally, history data (from repository 17b) is used to calculate workload statistics for use in shifting scheduled start times for executing jobs or a job stream. History data (i.e., historical records) comprises workload details (i.e., a measure of workload) associated with past executions (i.e., within computing system 10 and/or computing apparatus 8a and 8b) of jobs and job streams. History data is used to identify opportunities to optimize. A measure of workload may comprise, inter alia, a number of jobs executed simultaneously, a CPU load, memory use, an I/O rate, a derivated metric, etc.

Figure 2:
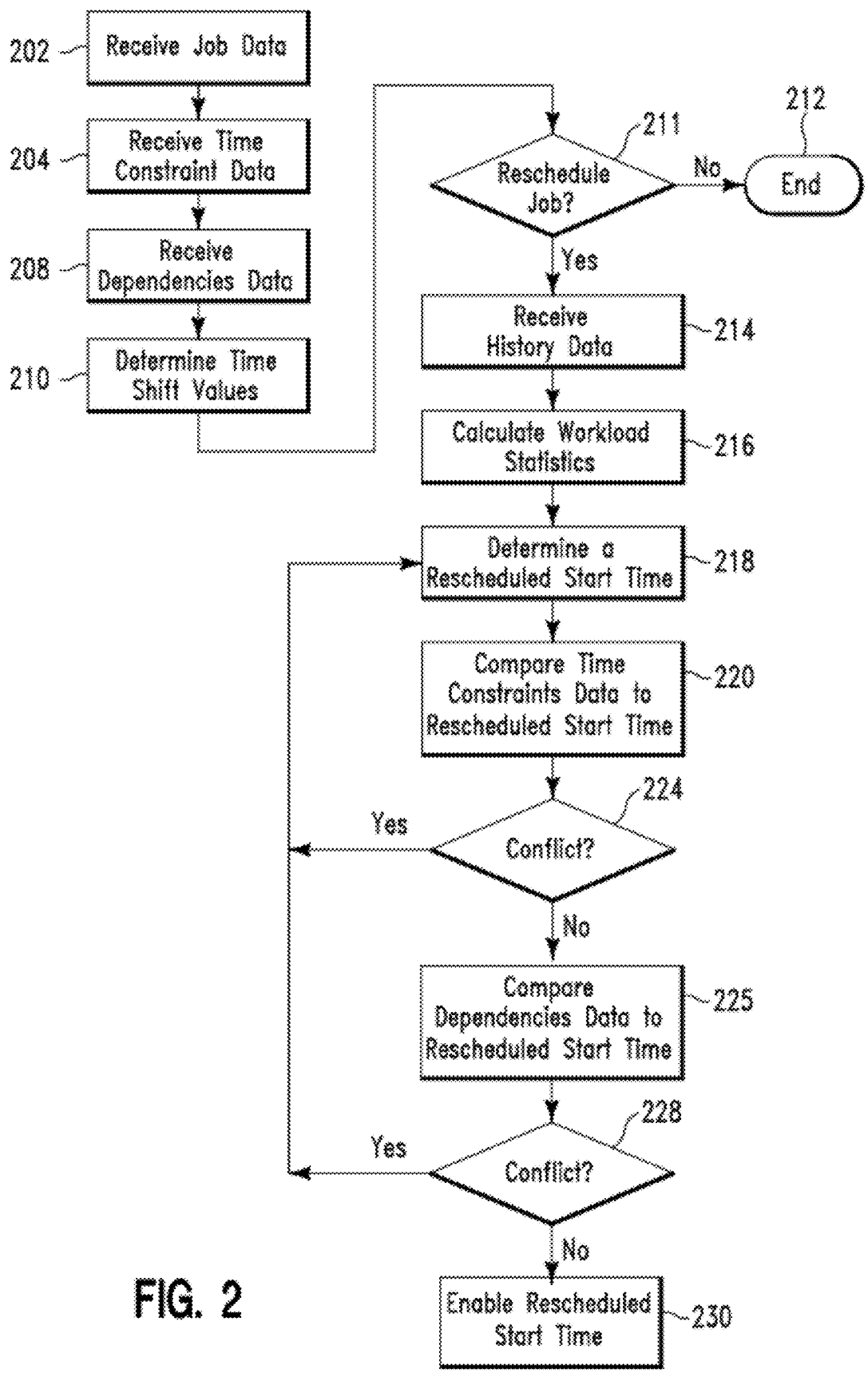
FIG. 2 illustrates a flowchart describing an algorithm used by the system of FIG. 1 for shifting or rescheduling scheduled start times for executing jobs or a job stream in a computing system, in accordance with embodiments of the present invention.

FIG. 2 illustrates a flowchart describing an algorithm used by system 2 of FIG. 1 for shifting or rescheduling scheduled start times for executing jobs or a job stream in a computing system, in accordance with embodiments of the present invention. In step 202, a scheduling administrator enters job related data (i.e., associated with jobs and/or job streams to be executed) into a computing system (e.g., computing system 10 of FIG. 1). In step 204, the scheduling administrator enters time constraint data associated with a job or job stream form the job related data into the computing system. In step 208, the scheduling administrator (optionally) enters dependencies data associated with prioritizing the job or job stream from the job related data (i.e., with respect to additional jobs to be executed) into the computing system. In step 210, maximum time shift values associated with the time constraint data are entered into the computing system. The time shift values comprise a maximum time period that the job or job stream may be shifted. For example time shift values may indicate that the job or job stream (originally scheduled for 4 pm) may only be shifted within a four hour time period surrounding the originally scheduled time of 4 pm e.g., between 2 pm and 6 pm, between 12 pm and 4 pm, between 4 pm and 8 pm, etc). In step 211, it is determined if a start time for execution of a job or job stream (i.e., form the job related data entered in step 202) be rescheduled. The determination is made based on the time constraint data (received in step 204), the optional dependencies data (received in step 208), and the time shift values (determined in step 210). If in step 211, it is determined that a start time for execution of a job or job stream (i.e., form the job related data entered in step 202) should not be rescheduled then the process is terminated in step 212.

If in step 211, it is determined that a start time for execution of a job or job stream (i.e., form the job related data entered in step 202) should be rescheduled then in step 214, history data (i.e., historical records) is received by the computing system. The history data comprises workload details (i.e., a measure of workload) associated with past executions of jobs and/or job streams. In step 216, workload statistics (i.e., associated with additional jobs to be executed by the computing system) are calculated based on the history data received in step 214. In step 218, a rescheduled start time based on the workload statistics is calculated. The rescheduled start time comprises a time when the computing system performs a fewest number of specified functions as compared to all other functions performed by the computing system. For example, the specified functions may comprise any computer functions including, inter alia, a number of jobs executed, a CPU load for the computing system, memory usage for the computing system, an input/output (I/O) rate for the computing system, any derived metric, etc. In step 220, the time constraint data received in step 204 is compared with the rescheduled start time. In step 224, it is determined (i.e., based on the comparing in step 220) if the rescheduled start time is in conflict with the time constraint data. If in step 224, it is determined that the rescheduled start time is in conflict with the time constraint data then step 218 is repeated to determine an updated rescheduled start time. If in step 224, it is determined that the rescheduled start time is not in conflict with the time constraint data then in step 225, (i.e., optional step) the dependencies data received in step 208 is compared with the rescheduled start time. In step 228, it is determined (i.e., based on the comparing in step 225) if the rescheduled start time is in conflict with the dependencies data. If in step 228, it is determined (i.e., based on the comparing in step 225) that the rescheduled start time is in conflict with the dependencies data then step 218 is repeated to determine an updated rescheduled start time. If in step 228 it is determined (i.e., based on the comparing in step 225) that the rescheduled start time is not in conflict with the dependencies data then in step 230 the reschedule start time is enabled so that the job or job stream may be executed at the reschedule start time. The rescheduled start time may be store in the computing system.

Figure 3:
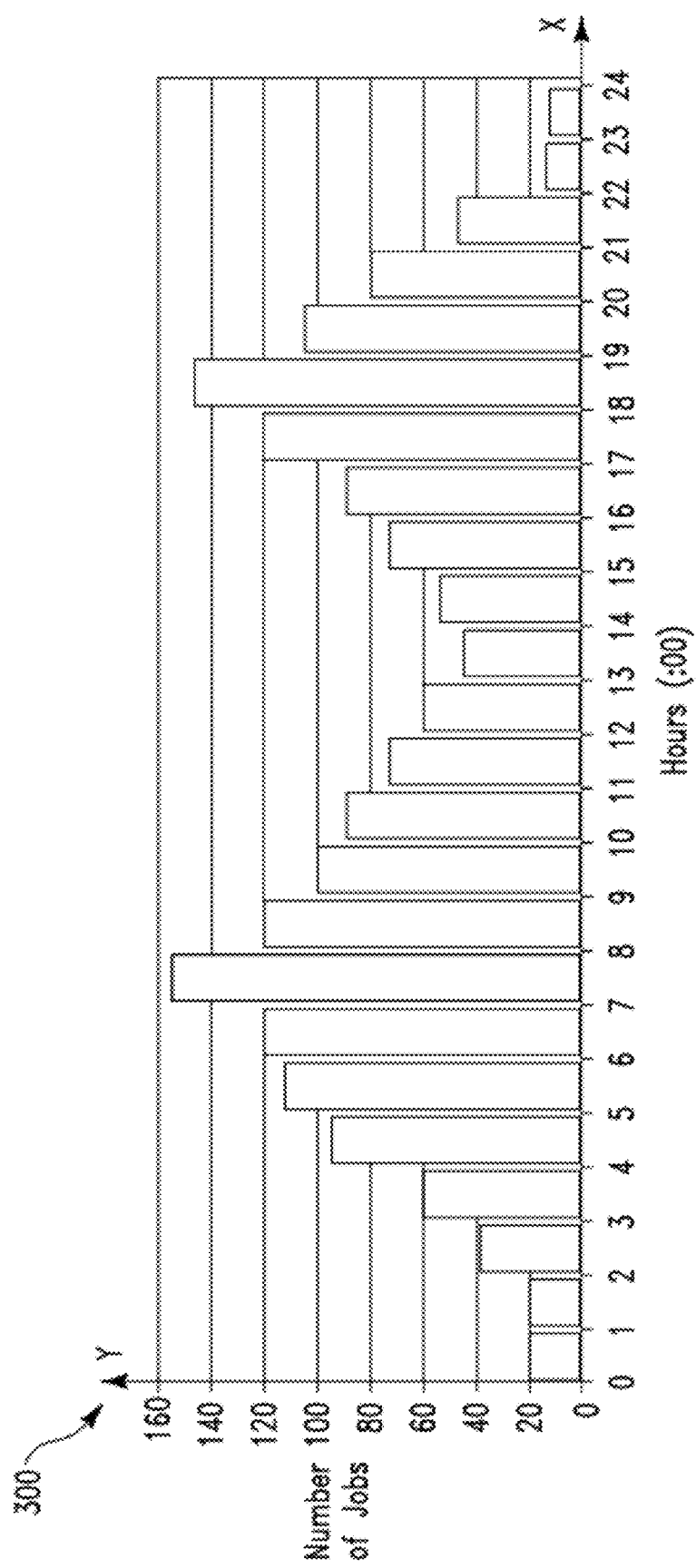
FIG. 3 illustrates a graph associated with a usage process comprising examples for shifting or rescheduling scheduled start times for executing jobs or a job stream in a computing system, in accordance with embodiments of the present invention.

FIG. 3 illustrates a graph 300 associated with a usage process comprising examples for shifting or rescheduling scheduled start times for executing jobs or a job stream in a computing system, in accordance with embodiments of the present invention. The X-axis represents hours in a day. The Y-axis represents a number of jobs. The usage process comprises the following examples:

EXAMPLE 1

The execution of the plan described with reference to example 1 occurs within a specified time period of 0:00 AM to 23:59 PM (i.e., 11:59 PM).

In example 1, an administrator of a scheduler system would like to define a first job associated with housekeeping for removing old data from a previous day. The first job does not have any dependencies and may be executed at any time. The administrator defines the first job and associated time constraints on a model. For example, a first start time for the first job may be set to 0:00 AM with a latest start time of 23:00 PM. The first job has a completion time of 30 minutes. A maximum time shift value is set to an automatic maximum value equaling a total duration of the plan. Rescheduling a start time for the first job generates changes on a planner module. When the start time is rescheduled, the planner module calculates workload statistics from history data. The planner module calculates when a workload (of the computing system) is lowest between the 0:00 AM-23:00 PM. As illustrated in graph 300, a best (lowest) workload time is at 23:00 PM (i.e., a number of jobs is about 10). Therefore, the rescheduled start time is set to 23:00 pm.

EXAMPLE 2

The execution of the plan described with reference to example 1 occurs within a specified time period of 0:00 AM to 23:59 PM (i.e., 11:59 PM).

In example 2, an administrator of a scheduler system would like to define a JobX for exporting a customer information database. JobX will be scheduled for each day after 16:00 PM and before the 23:59 PM. Additionally, jobX should be executed after startTimeY" (i.e., 17:00 PM) of JobY (i.e., jobY processes the customer information database) and after startTimeZ (i.e., 21:00 PM) of JobstreamZ (i.e., creates a set of HTML reports). In example 2, JobX has time constraints and dependencies. The administrator defines the first job and associated time constraints on a model. For example, a first start time for the first job may be set to 16:01 PM with a latest start time of 23:00 PM. The first job has a completion time of 30 minutes. A maximum time shift value is set to an automatic maximum value equaling a total duration of the plan. Rescheduling a start time for the first job generates changes on a planner module. When the start time is rescheduled, the planner module calculates workload statistics from history data. The planner module calculates when a workload (of the computing system) is lowest between 16:01 PM-23:00 PM., As illustrated in graph 300, a best (lowest) workload time is at 23:00 PM (i.e., a number of jobs is about 10). When the constraints and dependencies are compared to the best (lowest) workload time of 23:00 pm, it is determined the best start time should be re-calculated. Therefore the best start time for JobX is set to the 22:00 PM satisfying startTimeY and startTimeZ.

Figure 4:
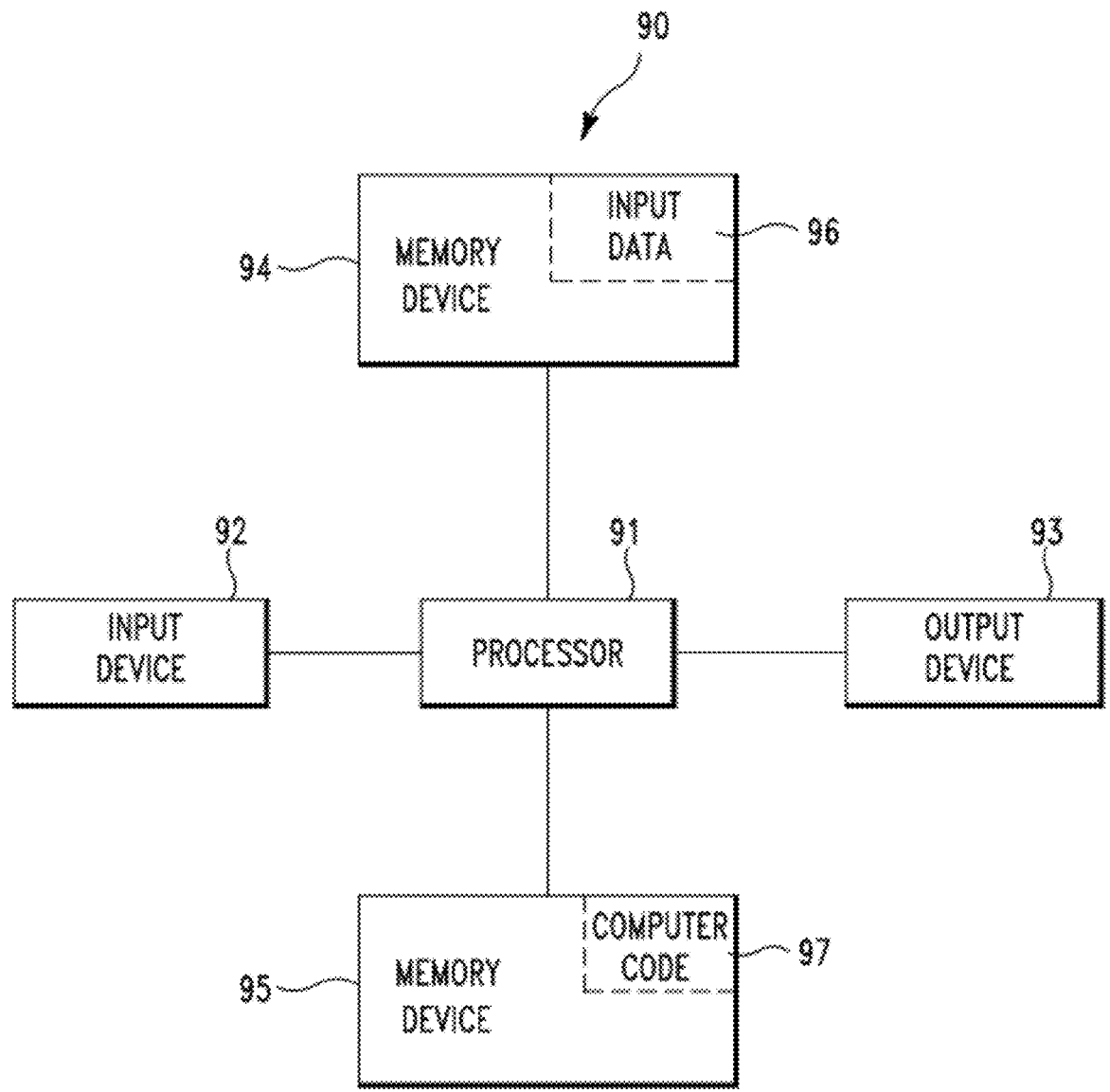
FIG. 4 illustrates a computer apparatus 90 (e.g., computing system 10 of FIG. 1) used for shifting scheduled start times for executing jobs or a job stream in a computing system, in accordance with embodiments of the present invention.

FIG. 4 illustrates a computer apparatus 90 (e.g., computing system 10 of FIG. 1) used for shifting scheduled start times for executing jobs or a job stream in a computing system, in accordance with embodiments of the present invention. The computer system 90 comprises a processor 91, an input device 92 coupled to the processor 91, an output device 93 coupled to the processor 91, and memory devices 94 and 95 each coupled to the processor 91. The input device 92 may be, inter alia, a keyboard, a software application, a mouse, etc. The output device 93 may be, inter alia, a printer, a plotter, a computer screen, a magnetic tape, a removable hard disk, a floppy disk, a software application, etc. The memory devices 94 and 95 may be, inter alia, a hard disk, a floppy disk, a magnetic tape, an optical storage such as a compact disc (CD) or a digital video disc (DVD), a dynamic random access memory (DRAM), a read-only memory (ROM), etc. The memory device 95 includes a computer code 97. The computer code 97 includes algorithms (e.g., the algorithm of FIG. 2) for shifting scheduled start times for executing jobs or a job stream in a computing system. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices not shown in FIG. 4) may comprise the algorithm of FIG. 2 and may be used as a computer usable medium (or a computer readable medium or a program storage device) having a computer readable program code embodied therein and/or having other data stored therein, wherein the computer readable program code comprises the computer code 97. Generally, a computer program product (or, alternatively, an article of manufacture) of the computer system 90 may comprise said computer usable medium (or said program storage device).

Still yet, any of the components of the present invention could be created, integrated, hosted, maintained, deployed, managed, serviced, etc. by a service provider who offers to shift scheduled start times for executing jobs or a job stream in a computing system. Thus the present invention discloses a process for deploying, creating, integrating, hosting, maintaining, and/or integrating computing infrastructure, comprising integrating computer-readable code into the computer system 90, wherein the code in combination with the computer system 90 is capable of performing a method for shifting scheduled start times for executing jobs or a job stream in a computing system. In another embodiment, the invention provides a business method that performs the process steps of the invention on a subscription, advertising, and/or fee basis. That is, a service provider, such as a Solution Integrator, could offer to provide a secure means to shift scheduled start times for executing jobs or a job stream in a computing system. In this case, the service provider can create, maintain, support, etc. a computer infrastructure that performs the process steps of the invention for one or more customers. In return, the service provider can receive payment from the customer(s) under a subscription and/or fee agreement and/or the service provider can receive payment from the sale of advertising content to one or more third parties.

While FIG. 4 shows the computer system 90 as a particular configuration of hardware and software, any configuration of hardware and software, as would be known to a person of ordinary skill in the art, may be utilized for the purposes stated supra in conjunction with the particular computer system 90 of FIG. 4. For example, the memory devices 94 and 95 may be portions of a single memory device rather than separate memory devices.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A scheduling method comprising:
receiving, by a computing system, job related data associated with a plurality of jobs to be executed by said computing system;
receiving, by said computing system, time constraint data associated with said plurality of jobs;
receiving, by said computing system, maximum time shift values associated with said time constraint data, wherein each maximum time shift value identifies a time period for which a start time for an associated job is started;
determining, by said computing system based on said time constraint data and said maximum time shift values, that the start time for execution of a first job of said plurality of jobs should be rescheduled;
in response to determining that the start time for execution of the first job of said plurality of jobs should be rescheduled, receiving, by said computing system, history data comprising workload details associated with past executions of jobs;
calculating, by said computing system based on the history data, workload statistics associated with additional jobs to be executed by said computing system;
determining, by said computing system based on said workload statistics, a first start time for said first job, wherein said first start time comprises a time when said computing system performs a fewest number of specified functions as compared to all other functions performed by said computing system, and wherein said first start time is selected from a specified time period identified in the maximum time shift value associated with the first job;
comparing, by said computing system, said time constraint data and said maximum time shift value with said first start time to determine whether said first start time is in conflict with said time constraint data and said maximum time shift value; and
responsive to said first start time is not in conflict with said time constraint data and said maximum time shift value, storing, by said computing system, said first start time.

2. The method of claim 1, wherein said comparing determines that said first start time is in conflict with said time constraint data and said maximum time shift value, and wherein said method further comprises:
determining, by said computing system based on said workload statistics, a second start time for said first job, wherein said second start time differs from said first start time, and wherein said second start time is selected from said specified time period identified in the maximum time shift value associated with the first job;
comparing, by said computing system, said time constraint data and said maximum time shift value with said second start time to determine whether said second start time is in conflict with said time constraint data and said maximum time shift value; and
responsive to said second start time is not in conflict with said time constraint data and said maximum time shift value, storing, by said computing system, said second start time.

3. The method of claim 2, wherein said comparing determines that said second start time is not in conflict with said time constraint data and said maximum time shift value, and wherein said method further comprises:
executing, by said computing system, said first job at said second start time.

4. The method of claim 1, wherein said comparing determines that said first start time is not in conflict with said time constraint data and said maximum time shift value, and wherein said method further comprises:
executing, by said computing system, said first job at said first start time.

5. The method of claim 1, further comprising:
receiving, by said computing system, dependencies data associated with prioritizing said plurality of jobs, wherein said determining said first start time is further based on said dependencies data.

6. The method of claim 5, wherein said comparing determines that said first start time is not in conflict with said time constraint data and said maximum time shift value, wherein said dependencies data indicates that said first start time should occur after a second job of said plurality of jobs has been executed, and wherein said method further comprises:
executing, by said computing system, said second job; and
after executing said second job, executing by said computing system, said first job at said first start time.

7. The method of claim 1, wherein said plurality of jobs comprise units of work to be executed by said computing system.

8. The method of claim 1, wherein said specified functions comprise functions selected from the group consisting of executing said additional jobs, a central processing unit load, memory use, and an input/output rate.

9. A computing system comprising
a processor coupled to a computer-readable memory unit, said memory unit comprising instructions that when executed by the processor implements a scheduling method, said method comprising:
receiving, by said computing system, job related data associated with a plurality of jobs to be executed by said computing system;

receiving, by said computing system, time constraint data associated with said plurality of jobs;

receiving, by said computing system, maximum time shift values associated with said time constraint data, wherein each maximum time shift value identifies a time period for which a start time for an associated job is started;

determining, by said computing system based on said time constraint data and said maximum time shift values, that the start time for execution of a first job of said plurality of jobs should be rescheduled;

in response to determining that the start time for execution of the first job of said plurality of jobs should be rescheduled, receiving, by said computing system, history data comprising workload details associated with past executions of jobs;

calculating, by said computing system based on the history data, workload statistics associated with additional jobs to be executed by said computing system;

determining, by said computing system based on said workload statistics, a first start time for said first job, wherein said first start time comprises a time when said computing system performs a fewest number of specified functions as compared to all other functions performed by said computing system, and wherein said first start time is selected from a specified time period identified in the maximum time shift value associated with the first job;

comparing, by said computing system, said time constraint data and said maximum time shift value with said first start time to determine whether said first start time is in conflict with said time constraint data and said maximum time shift value; and responsive to said first start time is not in conflict with said time constraint data and said maximum time shift value, storing, by said computing system, said first start time.

10. The computing system of claim 9, wherein said comparing determines that said first start time is in conflict with said time constraint data and said maximum time shift value, and wherein said method further comprises:

determining, by said computing system based on said workload statistics, a second start time for said first job, wherein said second start time differs from said first start time, and wherein said second start time is selected from said specified time period identified in the maximum time shift value associated with the first job;

comparing, by said computing system, said time constraint data and said maximum time shift value with said second start time to determine whether said second start time is in conflict with said time constraint data and said maximum time shift value; and responsive to said first start time is not in conflict with said time constraint data and said maximum time shift value, storing, by said computing system, said second start time.

11. The computing system of claim 10, wherein said comparing determines that said second start time is not in conflict with said time constraint data and said maximum time shift value, and wherein said method further comprises:

executing, by said computing system, said first job at said second start time.

12. The computing system of claim 9, wherein said comparing determines that said first start time is not in conflict with said time constraint data and said maximum time shift value, and wherein said method further comprises:

executing, by said computing system, said first job at said first start time.

13. The computing system of claim 9, wherein said method further comprises:

receiving, by said computing system, dependencies data associated with prioritizing said plurality of jobs, wherein said determining said first start time is further based on said dependencies data.

14. The computing system of claim 13, wherein said comparing determines that said first start time is not in conflict with said time constraint data and said maximum time shift value, wherein said dependencies data indicates that said first start time should occur after a second job of said plurality of jobs has been executed, and wherein said method further comprises:

executing, by said computing system, said second job; and after executing said second job, executing by said computing system, said first job at said first start time.

15. The computing system of claim 9, wherein said plurality of jobs comprise units of work to be executed by said computing system.

16. The computing system of claim 9, wherein said specified functions comprise functions selected from the group consisting of executing said additional jobs, a central processing unit load, memory use, and an input/output rate.

17. A computer program product, comprising a non-transitory computer readable storage medium comprising a computer readable program code embodied therein, said computer readable program code adapted to implement a scheduling method within a computing system, said method comprising:

receiving, by said computing system, job related data associated with a plurality of jobs to be executed by said computing system;

receiving, by said computing system, time constraint data associated with said plurality of jobs;

receiving, by said computing system, maximum time shift values associated with said time constraint data, wherein each maximum time shift value identifies a time period for which a start time for an associated job is started;

determining, by said computing system based on said time constraint data and said maximum time shift values, that the start time for execution of a first job of said plurality of jobs should be rescheduled;

in response to determining that the start time for execution of the first job of said plurality of jobs should be rescheduled, receiving, by said computing system, history data comprising workload details associated with past executions of jobs;

calculating, by said computing system based on the history data, workload statistics associated with additional jobs to be executed by said computing system;

determining, by said computing system based on said workload statistics, a first start time for said first job, wherein said first start time comprises a time when said computing system performs a fewest number of specified functions as compared to all other functions performed by said computing system, and wherein said first start time is selected from a specified time period identified in the maximum time shift value associated with the first job;

comparing, by said computing system, said time constraint data and said maximum time shift value with said first start time to determine whether said first start time is in conflict with said time constraint data and said maximum time shift value; and responsive to said first start time is not in conflict with said time constraint data and said maximum time shift value, storing, by said computing system, said first start time.

18. The computer program product of claim 17, wherein said comparing determines that said first start time is in conflict with said time constraint data and said maximum time shift value, and wherein said method further comprises:
- determining, by said computing system based on said workload statistics, a second start time for said first job, wherein said second start time differs from said first start time, and wherein said second start time is selected from said specified time period identified in the maximum time shift value associated with the first job;
- comparing, by said computing system, said time constraint data and said maximum time shift value with said second start time to determine whether said second start time is in conflict with said time constraint data and said maximum time shift value; and
- responsive to said second start time is not in conflict with said time constraint data and said maximum time shift value, storing, by said computing system, said second start time.

19. The computer program product of claim 18, wherein said comparing determines that said second start time is not in conflict with said time constraint data and said maximum time shift value, and wherein said method further comprises:
- executing, by said computing system, said first job at said second start time.

20. The computer program product of claim 17, wherein said comparing determines that said first start time is not in conflict with said time constraint data and said maximum time shift value, and wherein said method further comprises:
- executing, by said computing system, said first job at said first start time.

* * * * *